United States Patent

Kakiwaki et al.

Patent Number: 6,044,242
Date of Patent: Mar. 28, 2000

[54] IMAGE FORMING APPARATUS WITH DYNAMIC VIBRATION REDUCTION

[75] Inventors: Shigeaki Kakiwaki, Nara; Toshiyuki Tanaka, Moriguchi; Tohru Okuda, Nara; Seiichi Nagatome, Tenri, all of Japan

[73] Assignee: Sharp Kabushiki Kaisha, Osaka, Japan

[21] Appl. No.: 09/129,170

[22] Filed: Aug. 5, 1998

[30] Foreign Application Priority Data

Aug. 5, 1997 [JP] Japan .................................... 9-210988

[51] Int. Cl.7 ........................................................ G03G 5/00
[52] U.S. Cl. ............................................ 399/297; 399/303
[58] Field of Search .................................. 399/297, 302, 399/303, 308, 313, 116–117, 159, 167

[56] References Cited

U.S. PATENT DOCUMENTS 5,420,664  5/1995  Miwa et al. ............................ 399/167

FOREIGN PATENT DOCUMENTS

| 0 585 897 A1 | 3/1994 | European Pat. Off. . |
| 0 586 869 A2 | 3/1994 | European Pat. Off. . |
| 02115861 | 4/1990 | Japan . |
| 04120582 | 4/1992 | Japan . |
| 04287070 | 10/1992 | Japan . |
| 05072836 | 3/1993 | Japan . |
| 06133122 | 5/1994 | Japan . |
| 07042773 | 2/1995 | Japan . |
| 07140841 | 6/1995 | Japan . |
| 08054047 | 2/1996 | Japan . |

*Primary Examiner*—Quana Grainger
*Attorney, Agent, or Firm*—David G. Conlin; David A. Tucker

[57] ABSTRACT

An image forming apparatus including a rotatably driven transfer drum is provided. The transfer drum includes a main body and a dynamic vibration reducer. The dynamic vibration reducer includes an inertia pipe having an inertial moment, and at least one element connecting the inertia pipe to the interior of the main body so as to provide a spring-like property and a damping property therebetween. The apparatus dynamically reduces vibrations in a predetermined frequency band, such as that of the natural frequency of a specific gear, or the natural frequencies of an entire drive mechanism. In particular, the apparatus reduces vibratory peaks generated during the operation of the image forming apparatus.

13 Claims, 12 Drawing Sheets

IMAGE FORMING APPARATUS WITH DYNAMIC VIBRATION REDUCTION

FIELD OF THE INVENTION

The present invention relates to an image forming apparatus of an electrophotographic printing system provided with an image forming use rotatable member and a transfer drum, for use in a printer, a copying machine, etc.

BACKGROUND OF THE INVENTION

FIG. 9 is a typical depiction schematically showing a structure of a generally used image forming apparatus 1 of an electrophotographic system for use in printers, copying machines, etc., which is provided with an image forming use rotatable member and a transfer drum. The image forming apparatus 1 shown in FIG. 9 is provided with a photoreceptor drum 2 (image forming use rotatable member) and a transfer drum 3. The photoreceptor drum 2 is provided for visualizing an image to be printed into a toner image by a charger (not shown), a latent image forming use optical system and a developer device, etc. The transfer drum 3 is provided for transferring the toner image to a recording material such as paper, an OHP sheet, etc., to be permanently affixed to the recording material by a fuser (not shown).

As described, the image forming apparatus 1 of the electrophotographic system includes rotatable members such as the photoreceptor drum 2 serving as the image forming use rotatable member, the transfer drum 3, etc. These drums 2 and 3 rotate as respective gears 2a and 3a formed on one end of the photoreceptor drum and one end of the transfer drum 3 interlock with each other respectively. Specifically, a drive force from a motor 5 is transmitted to at least either one of these drums 2 and 3 (the photoreceptor drum 2 in the example arrangement shown in FIG. 9) via a drive transmission mechanism 6 composed of, for example, belts, pulleys and a gear string (belts and pulleys in the example arrangement of FIG. 9), thereby rotating the rotatable members of the photoreceptor drum 2 and the transfer drum 3.

It may be arranged such that the motor 5 is driven under a control of a drive circuit 7, and the motor 5, the drive transmission mechanism 6 and the drive circuit 7 serving as rotatable member drive means simultaneously drive a rotation mechanism such as a developer, a fuser, etc., (not shown) and a recording material transportation system of a recording material, etc.

Therefore, depending on factors such as a precision in shape of the drive transmission mechanism 6 such as the gears, the pulleys, etc., variations in drive torque of the motor 5, variations in load of the rotation mechanism or the transportation mechanism, etc., variations may occur in rotation speed of the drums 2 and 3. Such variations in rotation speed may cause a warp in length of the recording material in a transportation direction, resulting in a significant degrading of an image quality. Such problems can be suppressed to some extent by selecting an optimal design, for example, for improvements of the precision and the rigidity of the drive transmission mechanism 6, and suppression of the torque deviations of the motor, etc. However, it is difficult to eliminate the described problem of variations in rotation speed.

Typical conventional arrangements for suppressing variations in speed include, for example, those disclosed by Japanese Unexamined Patent Publication No. 120582/1992 (Tokukaihei 4-120582), Japanese Unexamined Patent Publication No. 72836/1993 (Tokukaihei 5-72836), Japanese Unexamined Patent Publication No. 140841/1995 (Tokukaihei 7-140841), etc. In the above prior arts, a dynamic vibration reducer is coaxially provided with a photoreceptor drum, and variations in speed are reduced by reducing vibrations by the photoreceptor drum.

However, in the above prior arts, since the dynamic vibration reducer is integrally provided with the expendable photoreceptor drum which is needed to be exchanged periodically. This means that every time the photoreceptor drum is exchanged, the dynamic vibration reducer which can be still used has to be exchanged together which raises a problem of an increase in maintenance cost.

On the other hand, in order to provide the dynamic vibration reducer separately from the photoreceptor, a coupling member is required for mounting the dynamic vibration reducer to the photoreceptor drum. In this case, for the coupling material, if a material of a small rigidity and a small mounting strength of the dynamic vibration reducer with respect to the photoreceptor drum, desirable effects of suppressing variations in speed, i.e., suppressing vibrations may not be achieved. Moreover, additional vibrations may occur by the use of the coupling member. For this reason, for the materials of the coupling member, materials of high rigidity and mounting strength are required. For this requirement, the coupling member becomes large in size and heavy in weight, thereby increasing costs. Furthermore, it is required to take the suppression of vibrations generated from this additional member of the coupling member into consideration when designing, and the design choice of such apparatus is thus restricted.

In order to counteract the described problem, another arrangement is disclosed by Japanese Unexamined Patent Publication No 287070/1992 (Tokukaihei 4-287070) wherein a vibration reducer member is provided in a transfer drum which is not needed to be exchanged.

FIG. 10 is a perspective view of a transfer drum 11 having the described vibration reducing structure. FIG. 11 is a cross sectional view in an axial direction of the transfer drum 11. As shown in FIG. 10, the transfer drum 11 is arranged such that an elastic conductive sponge 13 is formed on a peripheral surface of a main body drum 12 made of metal, and further a conductive rubber 14 is formed on the peripheral surface of the conductive sponge 13.

As shown in FIG. 11, the main drum 12 includes a boss 16 formed at a center of a gear 15 mounted at one end of the main body drum 12, and a boss 18 formed at a center of an end plate 17 mounted at the other end. These bosses 16 and 18 are rotatably supported by the support member of the image forming apparatus main body. The gear 15 is in mesh with the gear formed at one end of the photoreceptor drum (not shown), and the photoreceptor drum and the transfer drum 11 rotates as being interlocked with each other, and variations in speed, i.e., vibrations generated from the drive transmission mechanism are reduced by the conductive sponge 13, thereby suppressing a degrading of an image quality due to the vibrations.

In the transfer drum 11 of the described prior art, however, vibrations generated from the drive transmission mechanism, the motor, etc., are reduced by the elastic deformation and viscous damping of the conductive sponge 13. Therefore, although the vibrations in various frequencies can be suppressed uniformly, peaky vibrations of natural frequency $\omega 0$ generated from a specific gear or an entire drive transmission mechanism shown in FIG. 12 cannot be reduced effectively.

SUMMARY OF THE INVENTION

It is an object of the present invention to provide an image forming apparatus having a dynamic vibration reducing structure which permits vibrations of natural frequency as well as vibrations generated from an entire drive mechanism to be reduced effectively at low cost.

In order to achieve the above object, the first image forming apparatus in accordance with the present invention is characterized by including:

a rotatable member which is rotatably driven, the rotatable member including:

a main body;

an inertia member having an inertia moment;

an elastic element having a spring property; and a damping element having a damping property, wherein the inertia member is mounted to the main body by means of the elastic element and the damping element, and the inertia member dynamically reduces vibrations in a predetermined frequency band.

According to the described arrangement, vibrations in a predetermined frequency band such as natural frequency of a specific gear, natural frequency of an entire drive transmission mechanism, etc., can be reduced dynamically, peaky vibrations can be reduced effectively.

Further, since a vibration reducing structure composed of the elastic element, the damping element and the inertia member can be integrally formed with the rotatable member, it is not necessary to design the vibration reducing structure to be detachable, thereby simplifying the design of the vibration reducing structure.

As described, the described arrangement provides an image forming apparatus which offers excellent vibration reducing performances and a quality print output without increasing the size of the apparatus.

The described first image forming apparatus may be arranged so as to include a drive mechanism for driving the rotatable member, wherein the predetermined frequency band includes natural frequencies of the drive mechanism.

According to the described arrangement, vibrations of natural frequencies of the drive transmission mechanism such as belts, pulleys, gears, etc., and the drive means such as a motor, etc., which significantly degrades an image quality can be suppressed effectively, and improved image quality can be achieved.

The second image forming apparatus of the present invention based on the described first image forming apparatus is an image forming apparatus of an electrophotographic printing system for transferring the toner image formed on the image forming-use rotatable member to a recording medium via a transfer drum, wherein the rotatable member is a transfer drum.

According to the described arrangement, by providing the vibration reducing structure not in the image forming use rotatable member which is required to be exchanged periodically but in the transfer drum which generally has a larger diameter than the image forming use rotatable member, a vibration reducing member of a large inertia moment can be used for the vibration reducing structure, and vibrations can be reduced more effectively. As a result, improved vibration reducing performances can be achieved for a desired frequency, and variation in rotation speed can be suppressed effectively, thereby obtaining a quality print output.

Additionally, since a large space can be ensured for storing the vibration reducing member composed of the elastic element and the damping element, wider selections for the constants of these members can be achieved. As this offers a larger degree of freedom on design, a greater vibration reducing effect can be achieved. Furthermore, as the described functions and effects can be achieved without requiring an additional space in the apparatus, an increase in size of the apparatus can be avoided.

The described second image forming apparatus may be arranged such that the inertia member supports the transfer drum so as to be freely rotatable, and is supported so as to be freely rotatable by a movable support axis mounted in the transfer drum.

It is further preferable that the elastic element and the damping element are a plurality of elastomers, and the inertia member is mounted to the inner surface of the transfer drum by means of the plurality of elastomers.

As described, by supporting the inertia member by a plurality of elastomers, even when adopting a material of a strong spring or a large Young's modulus, a spring constant can be set small. Then, by adjusting the elastomers to have a suitable thickness, the spring constant can be set as desired without being affected by the constant of the material to a large extent. Similarly, the damping coefficient can be set as desired, which permits a wider selection of the material.

Additionally, since the weight of the inertia member is supported by the support axis, the inertia member, i.e., the transfer drum can rotate with an improved precision, and in the meantime, the deterioration of the elastomers can be suppressed, and thus improved durability can be achieved.

For a fuller understanding of the nature and advantages of the invention, reference should be made to the ensuing detailed description taken in conjunction with the accompanying drawings.

DESCRIPTION OF THE EMBODIMENTS

First Embodiment

The following descriptions will explain one embodiment of the present invention in reference to figures.

Figure 1:
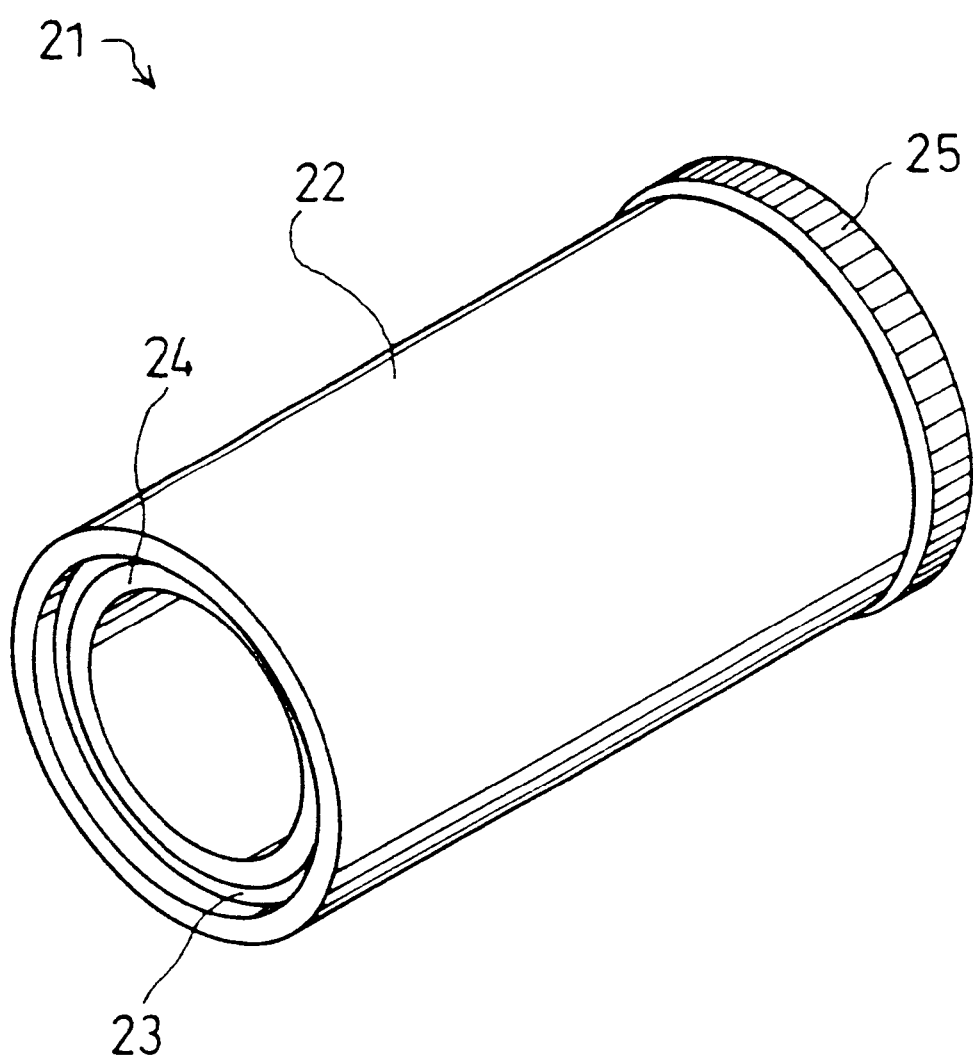
FIG. 1 is a perspective view of a transfer drum for use in an image forming apparatus in accordance with one embodiment of the present invention.
Figure 2:
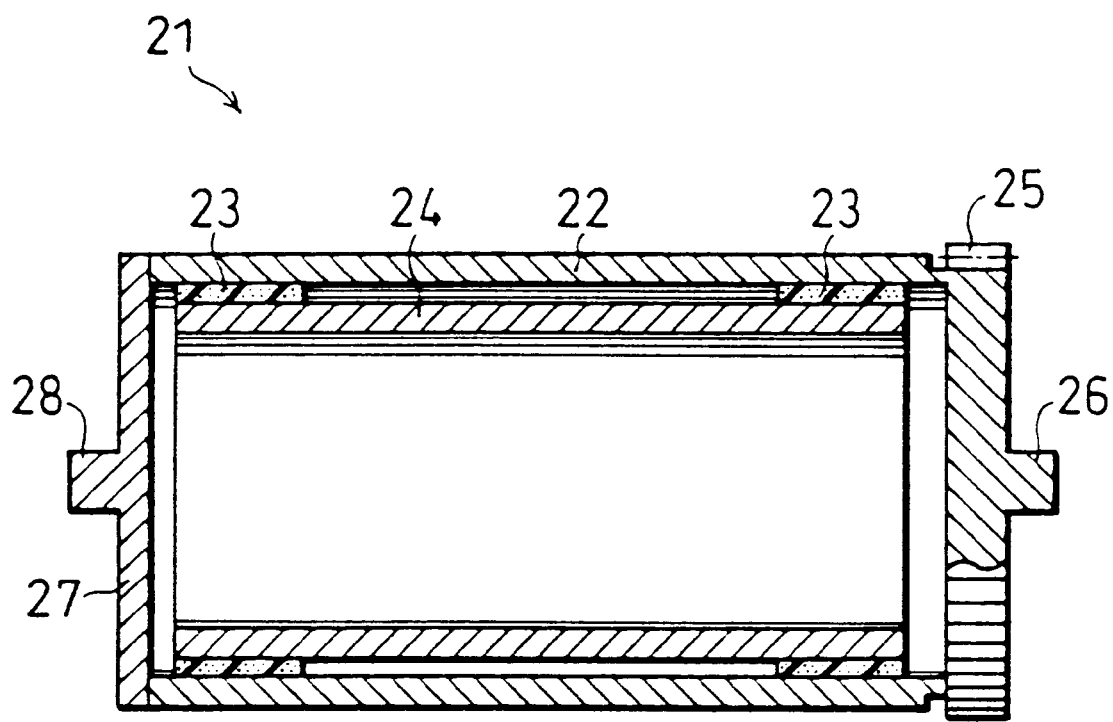
FIG. 2 is a cross sectional view in an axial direction of the transfer drum shown in FIG. 1.
Figure 9:
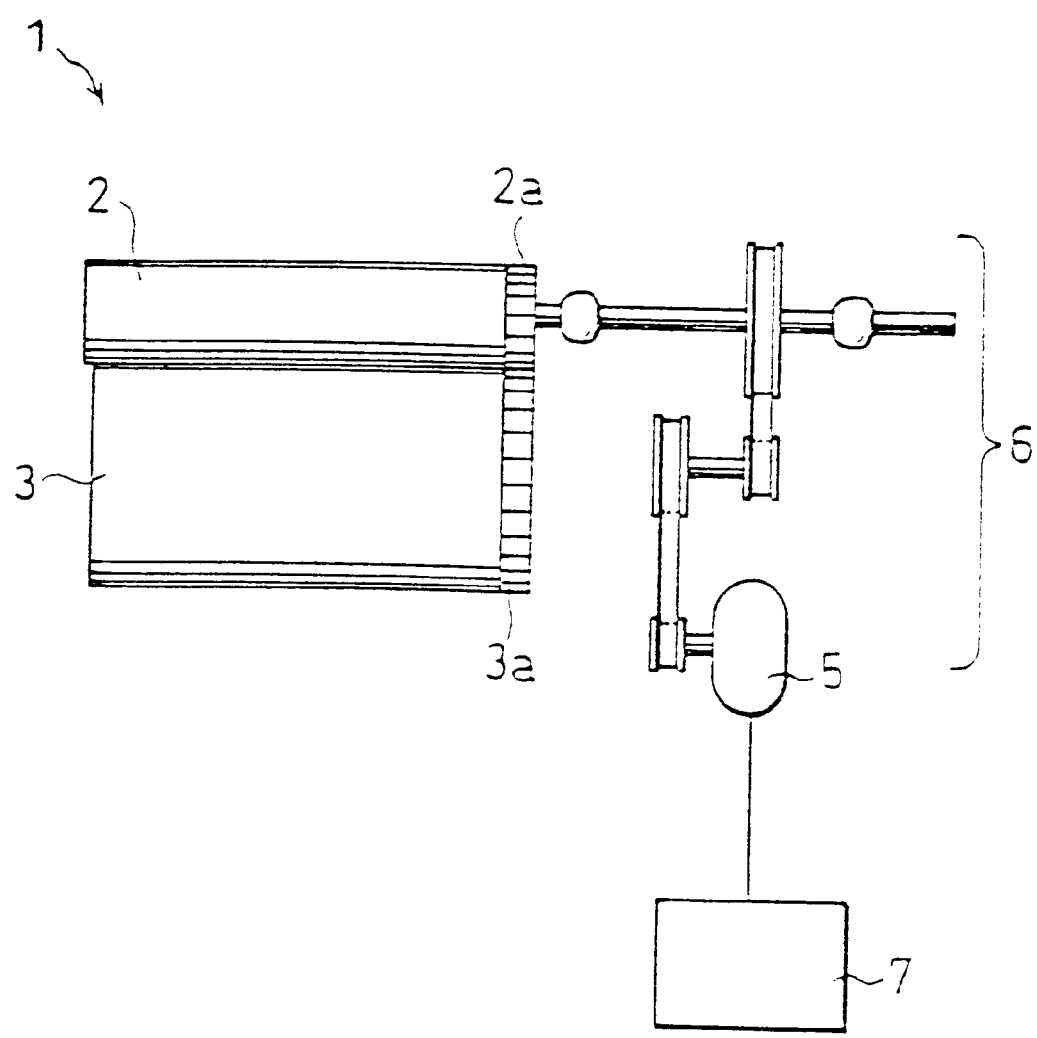
FIG. 9 is a typical depiction of a general structure of an image forming apparatus of an electrophotographic printing system.
Figure 10:
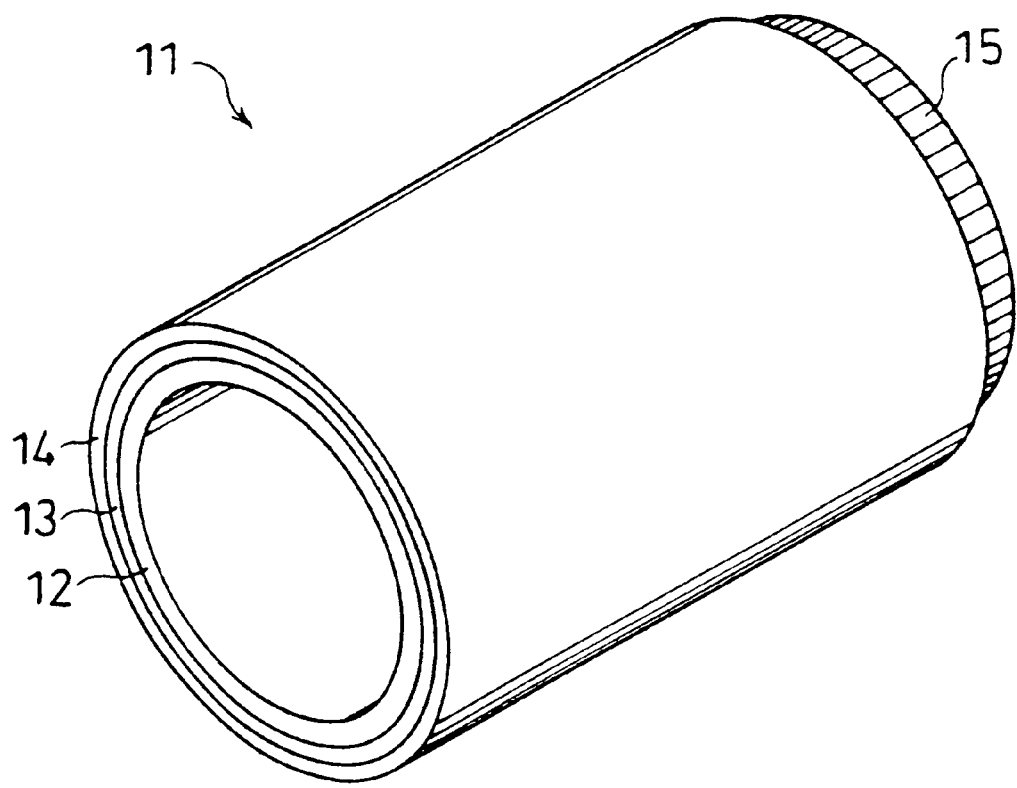
FIG. 10 is a perspective view showing a structure of a typical conventional transfer drum.
Figure 11:
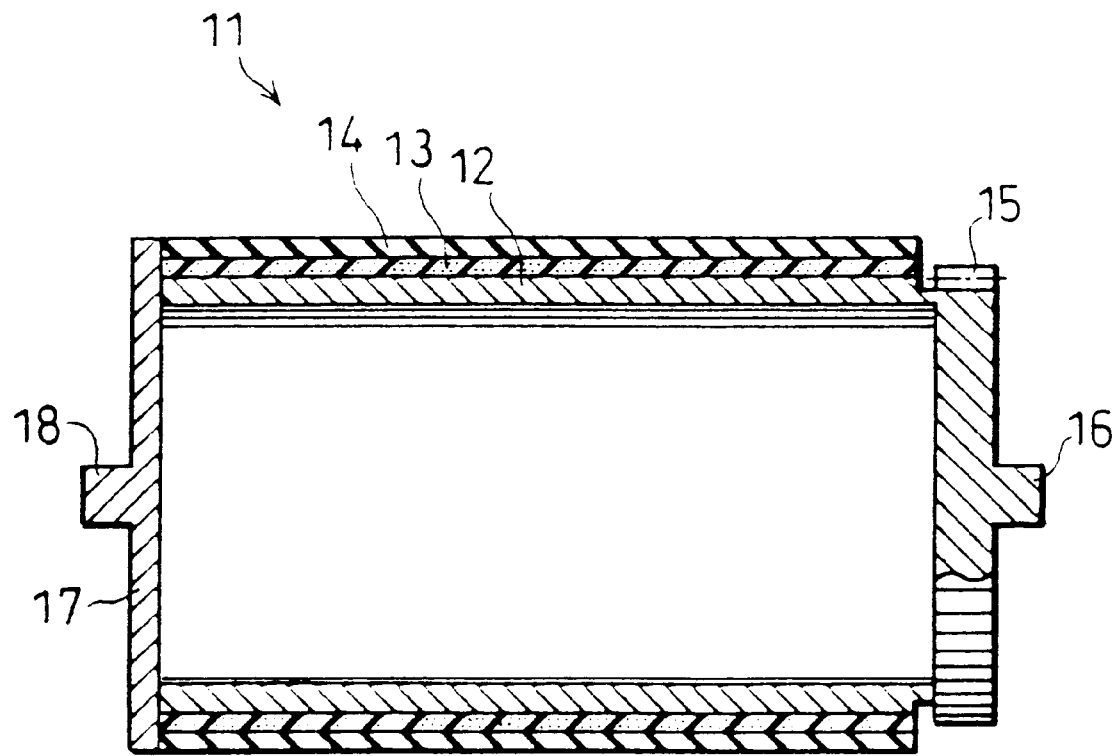
FIG. 11 is a cross-sectional view of the transfer drum shown in FIG. 10 in an axial direction.

FIG. 1 is a perspective view of a transfer drum 21 adopted in an image forming apparatus in accordance with first embodiment of the present invention. FIG. 2 is a cross-sectional view in an axial direction of the transfer drum 21. The transfer drum 21 is adopted for example in an image forming apparatus 1 shown in FIG. 9 adopted in explanations of the conventional example. The transfer drum 21 is arranged so as to rotate while maintaining a close contact with the photoreceptor drum 2 serving as an image forming rotating member, and transfer a toner image formed on the photoreceptor drum to a printing material.

The basic structure of the transfer drum 21 is such that a dynamic vibration reducer including sponge rubber members 23 and an inertia pipe 24 is mounted to a main body drum 22. Specifically, in the main body drum 22 made of metal, the ring-shaped sponge rubber members 23 are formed around both ends of the main body drum 22 so as to adhere to its uniform inner surface thereof having a maximum inside diameter. Further, the inertia pipe 24 made of stainless steel is bonded onto the inner surface of the sponge rubber members 23. The described sponge rubber members 23 function both as an elastic element and a damping element. On the other hand, the inertia pipe 24 functions as an inertia member.

On one end of the main body drum 22, a gear 25 in mesh with a gear 2a of a photoreceptor drum 2, for transmitting therefrom a drive force. Around a center of the gear 25, a boss 26 is mounted. On the other end portion of the main body drum 22, an end plate 27 is mounted. Around a center of the end plate 27, a boss 28 is mounted. These bosses 26 and 28 are supported by a support member formed in the image forming apparatus main body so that the transfer drum 21 can freely rotate.

Figure 3:
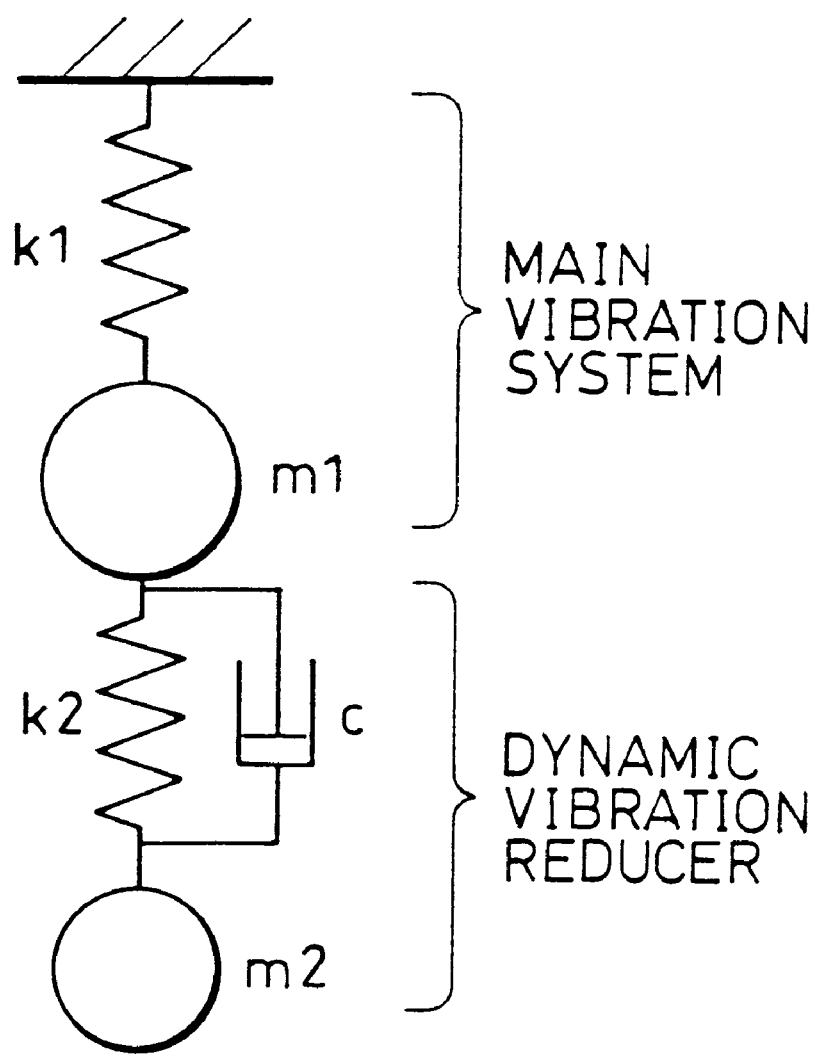
FIG. 3 is an explanatory view of vibration model of an image forming apparatus in the case of adopting the transfer drum shown in FIG. 1 and FIG. 2.

The image forming apparatus of the described transfer drum 21 can be shown in a typical depiction of FIG. 3 as a vibration model. For convenience in explanations, the vibration model shows the transfer drum serving as a rotation dynamic member in a linear dynamic system. The main oscillation system integrally shows the main body drum 22 and the photoreceptor drum 2, the drive force transmission mechanism 6 to be connected to the main body drum 22. In FIG. 3, m1 indicates an equivalent mass of the main oscillation system, and k1 indicates a spring constant based on the rigidity of the drive force transmitting section.

In contrast, the described dynamic vibration reducer is composed of the sponge rubbers 23 and the inertia pipe 24. In FIG. 3, m2 indicates an equivalent mass of the inertia pipe 24, k2 indicates a spring constant of the sponge rubbers 23, and c indicates a coefficient of viscous damping of the sponge rubbers 23.

Figure 4:
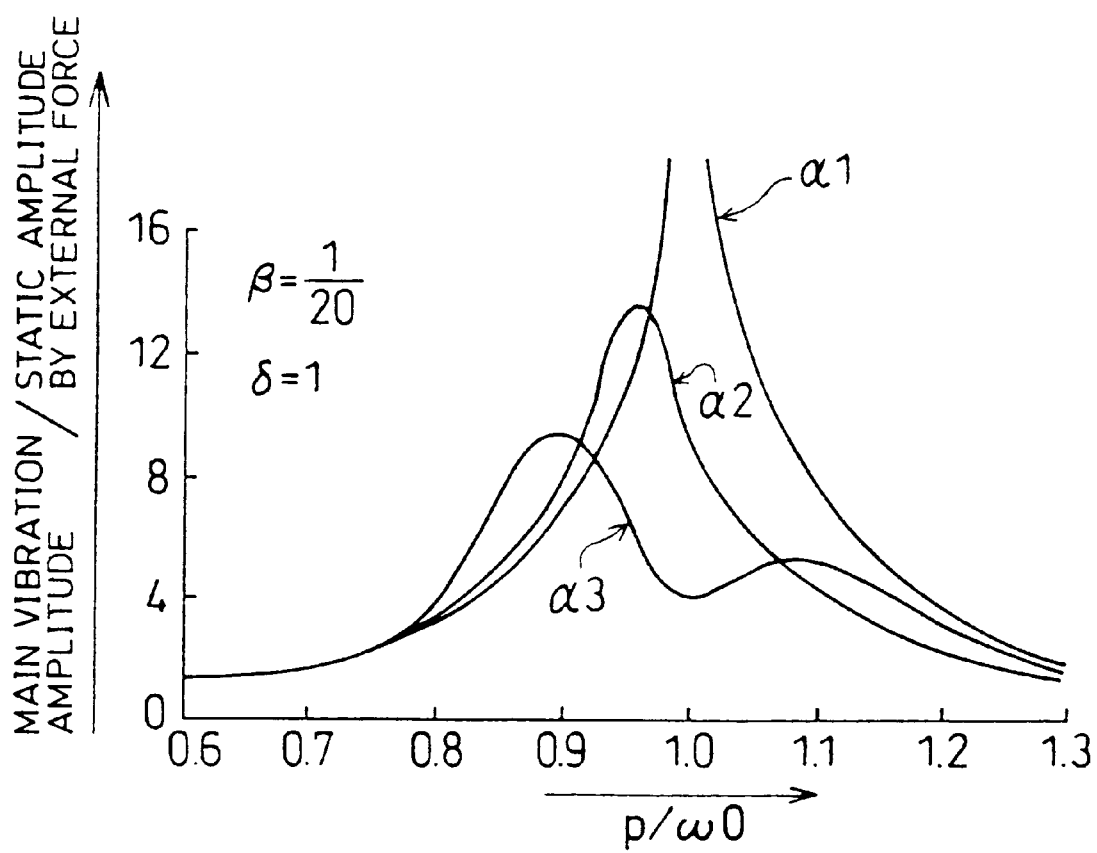
FIG. 4 is a graph which explains dynamic vibration reducing effect of the transfer drum shown in FIG. 1 and FIG. 2.

FIG. 4 shows a vibration amplitude of a main vibration system wherein p indicates an angular frequency of an external force. In FIG. 4, a y-axis indicates a vibration amplitude of the main vibration system based on the amount of static deviation by an external force in a ratio of the vibration amplitude of the main vibration system to the amount of static deviation. An x-axis indicates an angular frequency p based on a natural angular frequency $\omega 0$ in a ratio of the angular frequency p to the natural angular frequency $\omega 0$.

In FIG. 4, the curve $\alpha 1$ shows the state where the inertia pipe 24 is not provided, i.e., m2=0. In this case, a resonance occurs at $p/\omega 0=1.0$ where the natural frequency $\omega 0$ coincides with the angular frequency p of the external force. As can be seen from FIG. 4, the vibration amplitude of the main vibration system becomes infinity.

In contrast, in the case where the inertia pipe 24 is provided, the curve changes by the following factors: ① the mass ratio of the dynamic vibration reducer to the main vibration system, i.e., $m2/m1=\beta$; ② the ratio of the natural angular frequency $\omega 2$ of the dynamic vibration reducer to the natural angular frequency $\omega 0$ of the main vibration system, i.e., $\omega 2/\omega 0=\delta$; ③ the damping ratio $\mu$ of the dynamic vibration reducer $(=c/2 \cdot m2 \cdot \omega 0)$. The natural angular frequency $\omega 0$ of the main oscillation system and the natural angular frequency $\omega 2$ of the dynamic vibration reducer are respectively represented by the following formulae (1) and (2):

$$\omega 0 = \sqrt{\frac{k1}{m1}} \quad (1)$$

$$\omega 2 = \sqrt{\frac{k2}{m2}} \quad (2)$$

In FIG. 4, the curve $\alpha 2$ and the curve $\alpha 3$ indicate vibration amplitudes in response to changes in damping factor $\mu$ under the conditions of $\beta=\frac{1}{20}$ and $\delta=1$. The curve $\alpha 2$ shows the case where the damping factor $\mu=0.32$, and the curve $\alpha 3$ shows the case where the damping factor $\mu=0.10$. As can be seen from the results shown in FIG. 4, by varying the damping factor $\mu$, the level of the natural vibration changes. Accordingly, in the present invention, based on the dynamic vibration reduction theory, the frequency ratio $\delta$ and the damping ratio $\mu$ are set based on the following formulae (3) and (4) so that the optimal dynamic vibration reducing effects can be achieved.

$$\delta = \frac{1}{1+\beta} \quad (3)$$

$$\mu = \sqrt{\frac{3\beta}{8(1+\beta)^3}} \quad (4)$$

Figure 5:
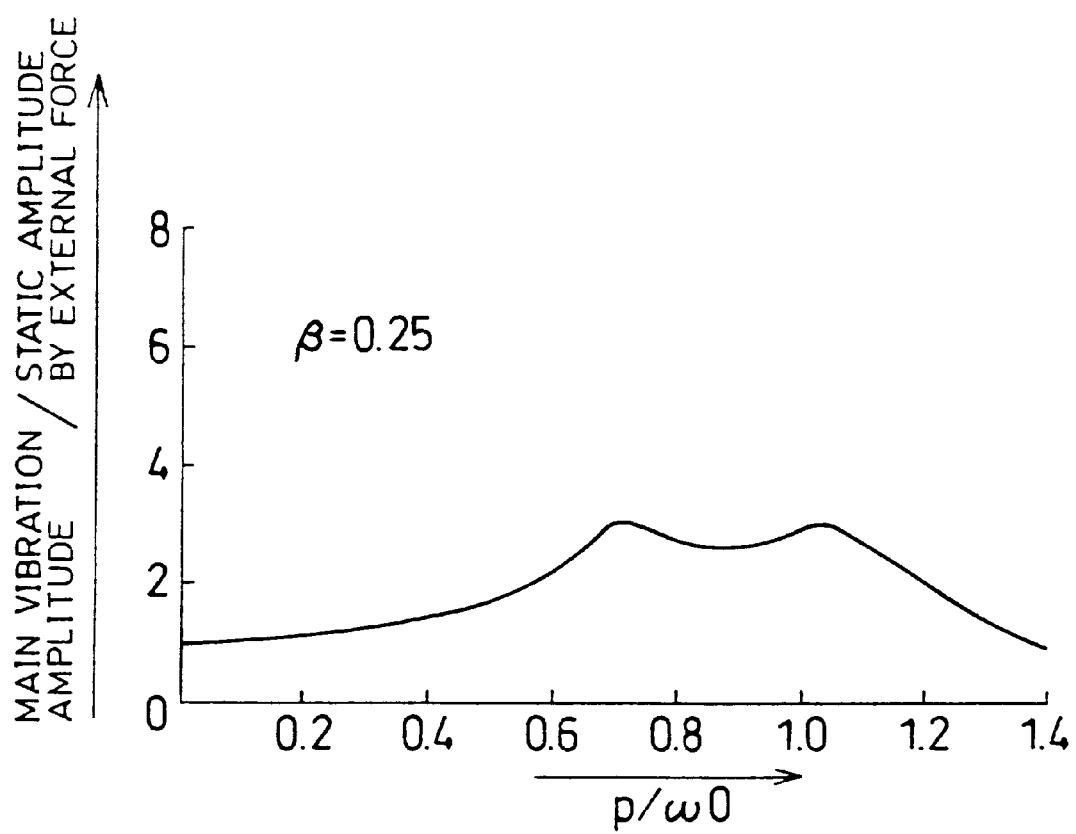
FIG. 5 is a graph showing characteristics of the transfer drum shown in FIG. 1 and FIG. 2 when the dynamic reducing effect is optimized.
Figure 6:
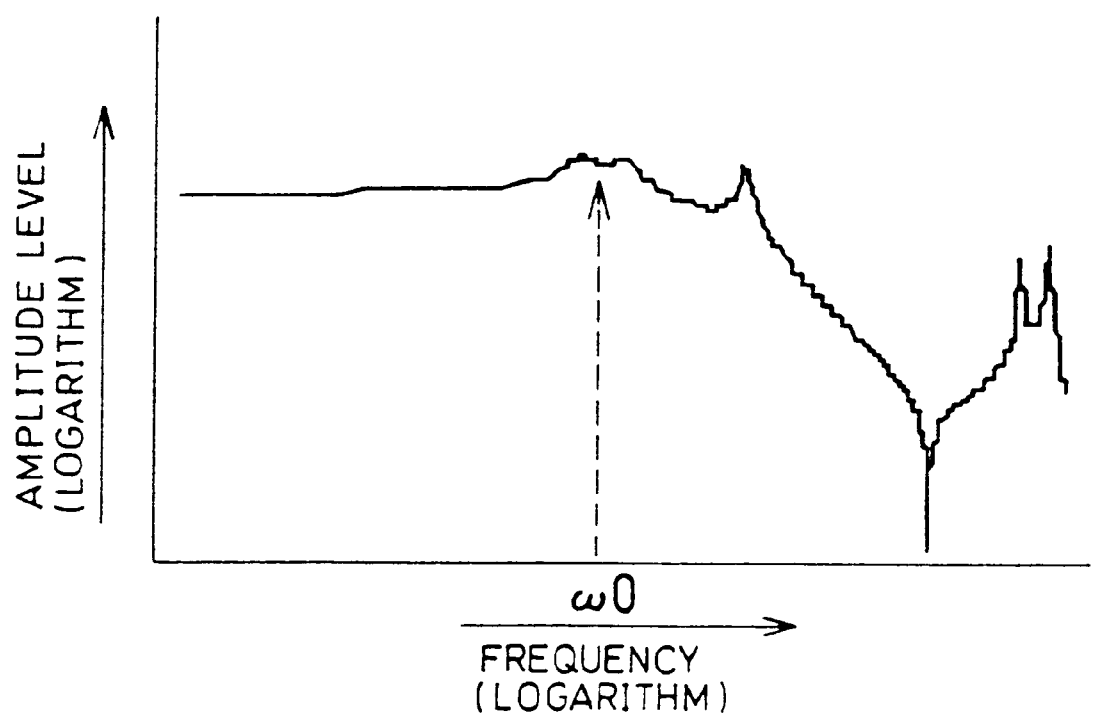
FIG. 6 is a graph showing a vibration level of an image forming apparatus adopting a transfer drum shown in FIG. 1 and FIG. 2.
Figure 12:
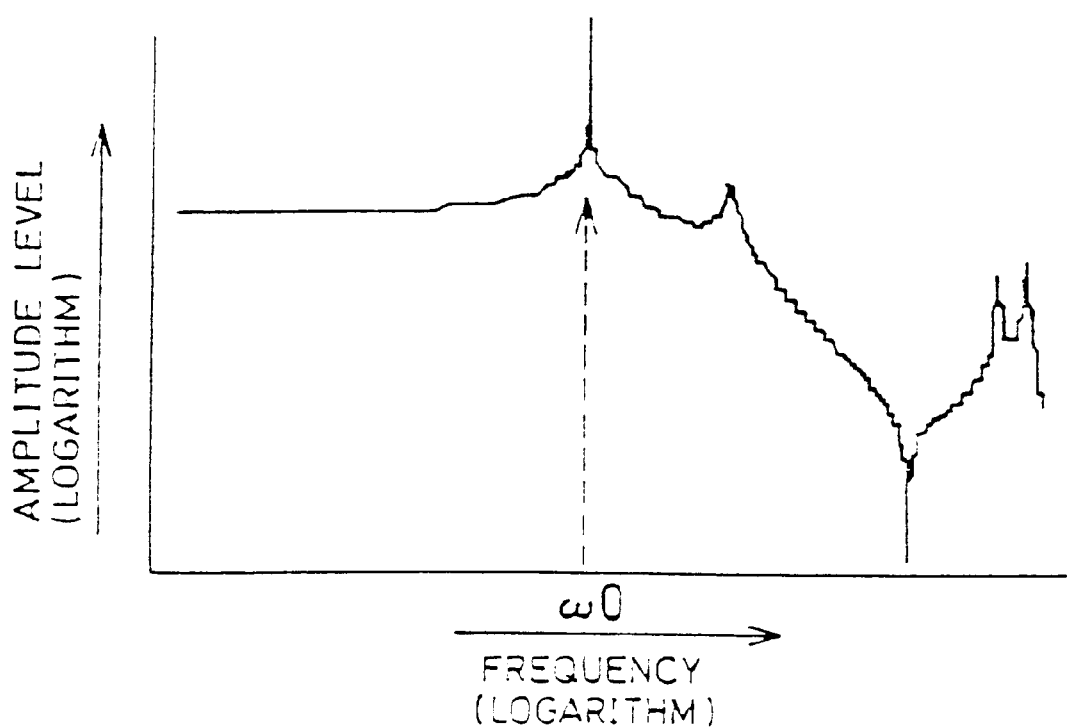
FIG. 12 is a graph showing a vibration level of the image forming apparatus adopting the conventional transfer drum shown in FIG. 10 and FIG. 11.

In the above formulae (3) and (4), when $\beta=0.25$, the frequency characteristics shown in FIG. 5 can be achieved, and vibrations can be reduced effectively. Therefore, in the case of adopting the transfer drum 21 having the structure shown in FIG. 1 and FIG. 2, the frequency characteristic of the image forming apparatus can be set, for example, as shown in FIG. 6. As can be seen from the comparison between the characteristics shown in FIG. 6 and the characteristics shown in FIG. 12, peaky vibrations at the natural angular frequency $\omega 0$ are effectively suppressed by the dynamic vibration reducer.

As described, in the image forming apparatus adopting the transfer drum 21 in accordance with the present embodiment, since the peaky natural vibrations can be eliminated dynamically by the dynamic vibration reducer, an occurrence of jitter in the photoreceptor drum and the transfer drum 21 can be suppressed, thereby obtaining an improved image quality. Moreover, by forming the dynamic vibration reducer in the transfer drum 21, compared with the case of providing the dynamic vibration reducer in the expendable photoreceptor drum, the running cost can be reduced. Furthermore, since the dynamic vibration reducer can be integrally formed with the transfer drum 21, compared with the arrangement which permits the dynamic vibration reducer to be installed and removed as desired, the restriction and burden when designing can be reduced.

Furthermore, since the dynamic vibration reducer is coaxially formed with the main body drum 22, compared with the arrangement wherein the dynamic vibration reducer is formed on the end side of the main body drum 2, the structure can be simplified, and the manufacturing cost can be reduced, and improved reliability and durability can be achieved. Furthermore, the dynamic vibration reducer can be formed in a cavity section in the inside of the main body drum 22. Namely, the dynamic vibration reducer can be provided utilizing the described dead space without increasing the size of the entire apparatus. Furthermore, since the dynamic vibration reducer is mounted to the portion having the maximum inside diameter of the main body drum 22, its functions can be expected without disturbances, thereby obtaining desirable dynamic vibration reducing effects.

According to the described arrangement, since the described sponge rubbers 23 serve both as the spring element and the damping element, not only that an improved reliability can be achieved but also that an improved efficiency can be achieved in the assembling process. Furthermore, by adopting foaming sponge rubbers 23, an optimal dynamic vibration reducer can be designed with ease using a material which is obtainable at low cost by changing the foamed ratio instead of changing a constant of the material to a desired elastic constant or a damping constant.

In the present embodiment, the transfer drum 21 is arranged so as to be provided with two ring-shaped sponge rubber members 23 mounted to both end portions of the transfer drum. However, the transfer drum of the present invention is not limited to the above, and, for example, it may be arranged such that the spring rubber 23 is formed on an entire inner surface of the main body drum 22, or three or more ring-shaped sponge rubbers 23 are provided.

In the present embodiment, the sponge rubber members 23 serve both as the spring element and the damping element. However, the present invention is not limited the above arrangement, and it may be arranged so as to provide the spring element and the damping element in separate members, for example, a spring made of metal and a viscous fluid, or a viscous resin material may be used, and not necessarily be a foaming material. Furthermore, the suitable material for the inertia pipe 24 is not limited to stainless steel, and other less expensive metals such as iron, aluminum, brass, etc., may be used. In the case where the inertia pipe having a small mass m2 can be used, a material such as resin, etc., may be used as well.

Furthermore, for example, even in the case where the properties of the spring rubbers 23 are allowed to be changed only to a small extent, and the parameter cannot be set to the values in conformity with the formula (3) and the formula (4), only by reducing the amplitude of the natural frequency, an improved image quality can be achieved, for example, from α1 to α2, compared with the arrangement without the dynamic vibration reducer.

As described, the image forming apparatus in accordance with the present embodiment is characterized by including:

a transfer drum 21 which is rotatably driven, the transfer drum 21 including a dynamic vibration reducer composed of:

a main body drum 22;

an inertia pipe 24 having an inertia moment; and sponge rubbers 23 serving as an elastic element having a spring property and a damping element having a damping property, wherein the inertia pipe 24 is mounted to the main body drum 22 by means of the sponge rubbers 23, and the inertia pipe 24 dynamically reduces vibrations in a predetermined frequency band.

The described image forming apparatus may be arranged so as to further include:

a drive transmission mechanism 6 for driving the transfer drum 21, wherein the predetermined frequency band includes natural frequencies of the drive transmission mechanism 6.

In the described arrangement, it is preferable that the sponge rubbers 23 are coaxially formed with the transfer drum 21.

It is more preferable that the sponge rubbers 23 are formed in the inside cavity section of the transfer drum 21.

In the described arrangement, it is preferable that the portion where the sponge rubbers 23 are mounted to the transfer drum 21 has a maximum inside diameter.

In the described arrangement, it is preferable that the inertia pipe 24 supports the transfer drum 21 so as to be freely rotatable, and is supported so as to be freely rotatable by a support axis movably mounted in the transfer drum 24.

Second Embodiment

The following descriptions will explain another embodiment of the present invention in reference to figures.

Figure 7:
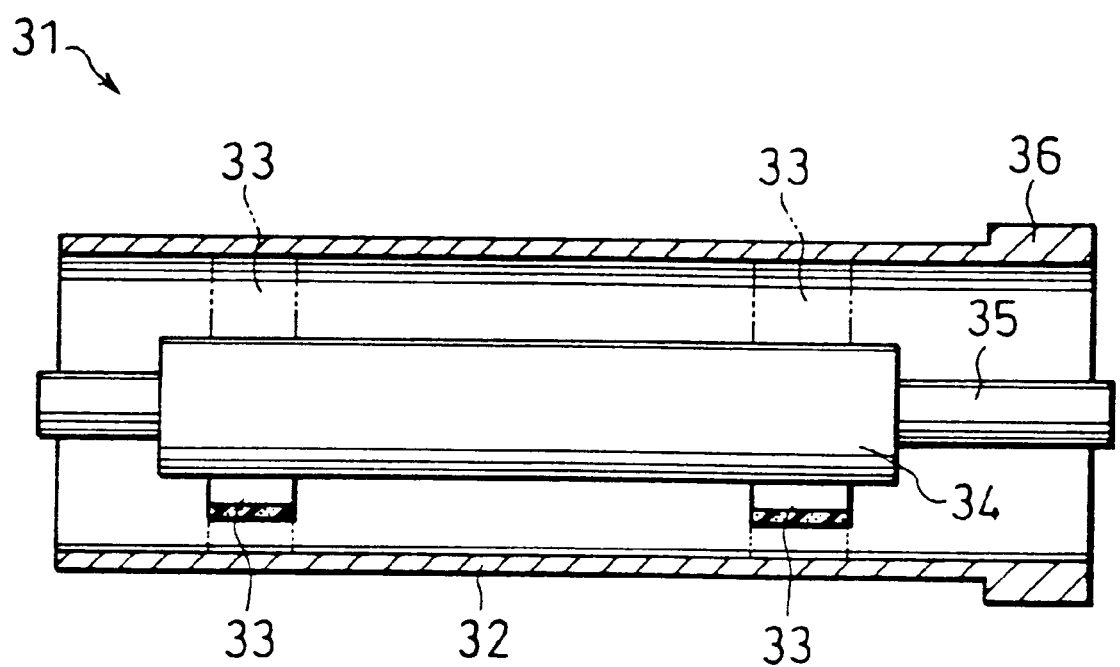
FIG. 7 is a cross-sectional view of a transfer drum in an axial direction in accordance with another embodiment of the present invention.
Figure 8:
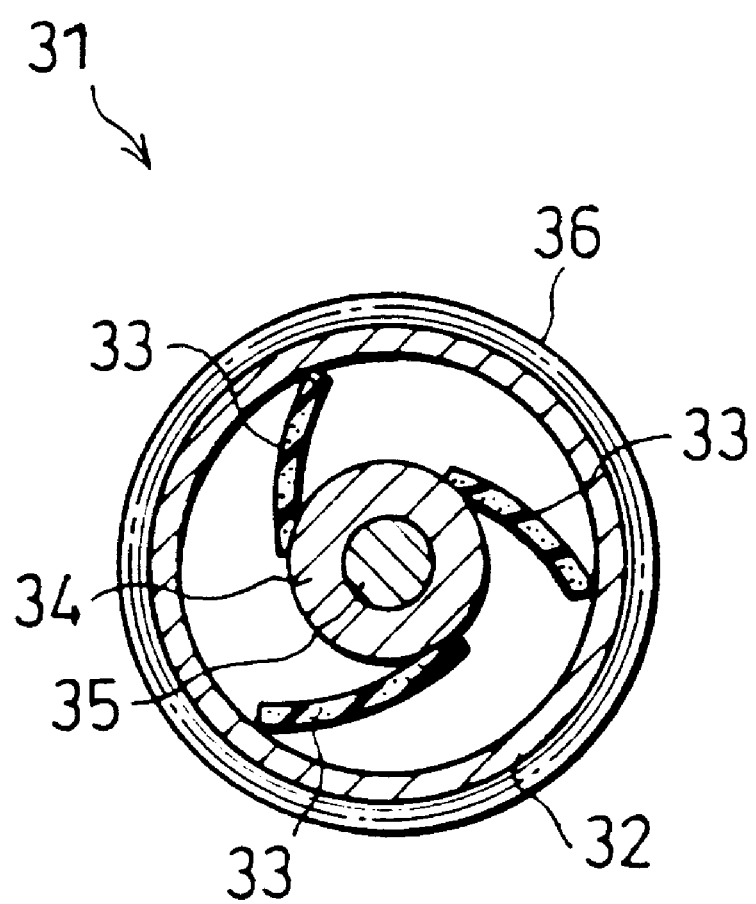
FIG. 8 is a cross-sectional view in a direction orthogonal to an axis of the transfer drum shown in FIG. 7.

FIG. 7 is a cross-sectional view of a transfer drum 31 in an axial direction in accordance with the present embodiment of the present invention. FIG. 8 is a cross-sectional view of the transfer drum 31 in a direction orthogonal to the axial direction. The transfer drum 31 is arranged such that an inertia pipe 34 is mounted to an inner surface of the main body drum 32 via elastomers 33 near both end portions of the main body drum 32. In this arrangement, three elastomers 33 are provided at each end portion of the main body drum 32. Further, a reference axis 35 is inserted into the inertia pipe 34 so as to be movable and is fixed to the main body. By this reference axis 35, the inertia pipe 34, i.e., the transfer drum 31 is supported so as to be freely rotatable. On one end side of the main body drum 32, a gear 36 in mesh with the gear 2a of the photoreceptor drum 2 is formed.

According to the described arrangement of the transfer drum 31, the elastomers 33 function both as the elastic element and the damping element, and the inertia pipe 34 functions as a inertia member. By setting the parameters of these elements in the aforementioned manner, the dynamic vibration reducing effects can be achieved.

As described, by supporting the inertia pipe 34 by a plurality of elastomers 33, even when adopting a material of a strong spring or a large Young's modulus, the spring constant k2 can be set small. Then, by adjusting the elastomer 33 to have a suitable thickness, the spring constant k2 can be set as desired without being affected by the constant of the material to a large extent. Similarly, the damping coefficient c can be set as desired, which permits a wider selection of the material.

Additionally, since the weight of the inertia pipe 34 is supported by the reference axis 35, the transfer drum 31 can rotate with an improved precision, and in the meantime, the deterioration of the elastomer 33 can be suppressed, and thus improved durability can be achieved.

Also in the structure shown in FIG. 7 and FIG. 8, the elastomers 33 may be provided at other portions or in different numbers. Further, although in the present invention, the elastomers 33 which functions both as the elastic element and the damping element are adopted, the present invention is not limited to this. For example, a metal member of a plate spring may be adopted as an elastic element, and a rubber member may be laminated thereon to be functioned as a damping member. Furthermore, like the transfer drum 21 adopted in the aforementioned embodiment, a sponge rubber may be adopted, such as a generally used rubber, silicone rubber, etc.

As described, the image forming apparatus of an electrophotographic printing system in accordance with the present invention for transferring a toner image formed on an image forming use rotatable member to a recording medium via a transfer drum is characterized in that the transfer drum includes an inertia member having an inertia moment, an elastic element having a spring property, a damping element having a damping property, wherein the inertia member is mounted to the main body drum via the elastic element and the damping element, so that vibrations of a predetermined frequency band can be reduced dynamically.

According to the described arrangement, the dynamic vibration reducer composed of the elastic member, the damping element and the inertia member is mounted not on the image forming use rotatable member which is required to be exchanged periodically but on the transfer drum. Thus, the running cost can be reduced, and the structure of reducing vibrations can be integrally formed with the transfer drum. As a result, the need of considering a detachable structure for reducing vibrations when designing, and the design of the apparatus can be eliminated.

In general, the transfer drum has a larger diameter than the image forming use rotatable member for the reason that considering its function of rotating while carrying thereon a printing sheet, the length of its periphery is required to be longer than the length of the sheet. On the other hand, since the image forming use rotatable member is expendable, and has a photoconductive material on its surface, it is not desirable to adopt the image forming use rotatable member of a large size in consideration of costs.

As described, since the transfer drum has a larger diameter than the image forming use rotatable member, in the present invention, the vibration reducing material of a large inertia moment can be used as the dynamic vibration reducer which can reduce the vibrations to a large degree. As this offers a high vibration reducing function for vibrations of a predetermined frequency, variations in rotation speed can be effectively suppressed, and a high quality print output can be obtained. Additionally, as a large space can be ensured for storing the vibration reducer composed of the elastic element and the damping element, a wider selection of the constants of these members can be achieved. As this offers a larger degree of freedom when designing the apparatus, an improved effect of suppressing vibrations can be achieved. Furthermore, since the above functions and effects can be achieved without requiring additional space, an increase in size of the apparatus can be suppressed.

Furthermore, the above arrangement enables the vibrations of a predetermined frequency to be reduced dynamically for the vibrations of natural frequencies of a specific gear, or the vibrations of natural frequency of an entire drive transmission mechanism, and thus peaky vibrations can be reduced effectively.

As described, the above arrangement offers a high quality output by improving vibration reducing function compared with the arrangement of forming a dynamic vibration reducer in the inside or in the vicinity of the image forming use rotatable member.

The described arrangement may be arranged such that the predetermined frequency band includes natural frequencies of the drive means for driving the image forming use rotatable member.

According to the described arrangement, vibrations of natural frequencies of the drive transmission mechanism such as belts, pulleys, gears, etc., and the drive means such as a motor, etc., which significantly degrades an image quality can be suppressed effectively, and improved image quality can be achieved.

The described arrangement may be arranged such that the elastic element and the damping element are coaxially formed with the transfer drum.

According to the described arrangement, a simplified structure and a reduction in cost can be achieved, as well as improved reliability and durability.

The above arrangement may be further arranged such that the elastic element and the damping element are provided in an internal cavity section of the transfer drum.

According to the described arrangement, the dead space in the transfer drum can be effectively utilized, and enables the installation of the dynamic vibration reducer without increasing the size of the entire apparatus.

In the described arrangement, it is preferable that the portion of the transfer drum where the elastic element and the damping element are mounted has a maximum inside diameter.

According to the described arrangement, the function of the dynamic vibration reducer can achieved effectively, and excellent vibration reducing performances can be achieved.

The described arrangement may be arranged such that the inertia member supports the transfer drum so as to be freely rotatable, and is supported so as to be freely rotatable by a movable support axis mounted in the transfer drum.

According to the described arrangement, the inertia member is also supported by the support axis for supporting the transfer drum so as to be freely rotatable, the dynamic vibration reducer can rotate with high precision. In the meantime, since the weight of the inertia member is not applied to the elastic element and the damping element in a stoppage, improved durability can be achieved.

The described arrangement may be arranged such that the elastic element and the damping element are constituted by a single member.

According to the described arrangement, since the single member functions both as the elastic element and the damping element, a reduction in cost and improved reliability and assembling efficiency can be achieved.

In the above arrangement, for the material of the member serving both as the elastic element and the damping element, rubber may be adopted.

According to the described arrangement, excellent elastic property and damping property can be obtained using a material which is obtainable at a reasonable cost.

Alternately, for the material of the member serving both as the elastic element and the damping element, the foaming material may be adopted.

According to the described arrangement, the elastic constant and the damping constant can be set as desired not by changing the constant of the material but by changing the foamed degree. As a result, an optimal design of the dynamic vibration reducer can be achieved in a simple manner.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An image forming apparatus, comprising:

a transfer drum which is rotatable driven, said transfer drum including:

a main body;

an inertia member having an inertial moment; and mounting means having a spring property and a damping property, wherein said inertia member is mounted to said main body by said mounting means; said inertia member dynamically reduces vibrations in a predetermined frequency band, and, said image forming apparatus further comprises an electrophotographic printing system for transferring a toner image formed an a photoreceptor to said transfer drum, and from said transfer drum to a recording material.

2. The image forming apparatus as defined in claim 1, further comprising:

drive means for driving said transfer drum, wherein said drive means is disposed in interlocking relation with said transfer drum, and, wherein said predetermined frequency band includes the natural frequencies of said drive means.

3. An image forming apparatus as defined in claim 1, wherein:

said mounting means comprises is co-axially provided with said transfer drum.

4. The image forming apparatus as defined in claim 3, wherein:

said mounting means are provided in an inside cavity section of said transfer drum.

5. The image forming apparatus as defined in claim 4, wherein:

said inside cavity section of said transfer drum where said mounting means is mounted has a maximum inside diameter.

6. The image forming apparatus as defined in claim 1, wherein:

said inertia member rotatably supports said transfer drum so as to be freely rotatable and is supported so as to be freely rotatable by a movable support axis mounted in said transfer drum.

7. The image forming apparatus as defined in claim 6, wherein:

said mounting means comprise a plurality of elastomers, and said inertia member is mounted to an inner surface of said transfer drum by means of said plurality of elastomers.

8. The image forming apparatus as defined in claim 7, wherein:

said mounting means comprises a single member.

9. The image forming apparatus as defined in claim 8, wherein:

said mounting means is made of rubber.

10. The image forming apparatus as defined in claim 8, wherein:

said mounting means is made of a foaming material.

11. The image forming apparatus as defined in claim 1, wherein:

said mounting means comprises a single member.

12. The image forming apparatus as defined in claim 11, wherein:

said mounting means is made of rubber.

13. The image forming apparatus as defined in claim 12, wherein:

said mounting means is made of a foaming material.

* * * * *